United States Patent [19]

Wakasa et al.

[11] 4,234,342

[45] Nov. 18, 1980

[54] GLASS COMPOSITION

[75] Inventors: Isao Wakasa; Shuichi Yamazaki, both of Fukushima; Hideo Taguchi, Nihonmatsu, all of Japan

[73] Assignee: Nitto Boseki Co., Ltd., Fukushima, Japan

[21] Appl. No.: 963,164

[22] Filed: Nov. 22, 1978

[30] Foreign Application Priority Data

Nov. 30, 1977 [JP] Japan .................... 52-143725

[51] Int. Cl.$^3$ .................... C03C 13/00; C03C 3/04
[52] U.S. Cl. .................... 106/50; 106/54; 106/99
[58] Field of Search .................... 106/50, 52, 99

[56] References Cited

U.S. PATENT DOCUMENTS

| | | | |
|---|---|---|---|
| 3,783,092 | 1/1974 | Majundar | 106/50 |
| 3,861,926 | 1/1975 | Irlam et al. | 106/50 |
| 3,928,049 | 12/1975 | Otouma et al. | 106/50 |
| 4,014,705 | 3/1977 | Yale | 106/50 |

FOREIGN PATENT DOCUMENTS 49-53208  5/1974 Japan ............... 106/50

*Primary Examiner*—O. R. Vertiz
*Assistant Examiner*—Mark Bell
*Attorney, Agent, or Firm*—Norbert P. Holler; Alfred H. Hemingway

[57] ABSTRACT

A glass composition comprising 54–60% by weight of $SiO_2$, 13–16% by weight of $ZrO_2$, 12–15% by weight of $Na_2O$, 5.5–14% by weight of MnO and 0–7% by weight of CaO, in which MnO+CaO is 11% by weight or more and MnO$\geq$CaO, can produce alkali resistant glass fibers which can be used for reinforcing cement products.

3 Claims, No Drawings

GLASS COMPOSITION

This invention relates to a glass composition having good fiber-forming properties, particularly to a glass composition suitable for producing excellent alkali resistant glass fibers used as reinforcing material for cement products.

Glass fibers used for reinforcing cement products should have alkali resistance. It is well known that when a certain amount of zirconium oxide is added to glass, particularly alkali-containing glass, alkali resistance of the glass increases and alkali resistant glass fibers can be produced. A typical glass composition having such a zirconium oxide content is disclosed in Japanese Pat. Appln. Kokoku (Post-Exam. Publn.) No. 40,126/74. The glass composition disclosed therein contains such a large amount of 7 to 11% by mole of zirconium oxide but has a relatively low fiber-forming temperature of 1320° C. or less, said temperature being considerably lower than that of about 1450° C. or higher in the case of a conventional glass composition containing zirconium oxide. But such a glass composition containing a high zirconium oxide content has a higher liquidus temperature and poor melting properties, so that it is very difficult to obtain uniform molten glass and to carry out fiber forming. For example, the glass composition having a high zirconium oxide content is poorer in melting properties than E glass which has generally a high fiber-forming temperature due to containing no alkali metal component. Further its fiber-forming temperature is about 70° to 160° C. higher than that of E glass. Therefore, there arise many defects in that refractories used for such a glass composition are very limited, erosion of the refractories is remarkable, life of a platinum bushing used for spinning such a glass composition is short, and the like.

On the other hand, there are many methods for spinning glass fibers, for example, a method of using a flat nozzle plate made of a noble metal and having a large number of nozzles, a method of using a nozzle plate having a large number of tip nozzles, a further method of using a tip nozzle plate which has cooling fins installed in parallel among rows of tips so as to cool cones of molten glass formed on each tip, and the like. When the glass composition having a high zirconium oxide content is used for spinning, an apparatus, particularly cooling fins, is damaged by the alkali components evaporated from the cones of molten glass due to the presence of a large amount of alkali metal oxides in the glass composition, which results in lowering in stable spinning.

It is an object of the present invention to provide an alkali resistant glass composition containing zirconium oxide overcoming these defects mentioned above and excellent in alkali resistance, melting properties, and being easily cooled. It is another object of the present invention to provide the glass composition having a lower fiber-forming temperature and the same workability as E glass in fiber forming, and being applicable to any spinning methods without damaging the apparatus, particularly cooling fins when a tip nozzle plate is used and with giving stable spinning of glass fibers.

The present invention provides a glass composition which comprises $SiO_2$: 54–60% by weight,
$ZrO_2$: 13–16% by weight,
$Na_2O$: 12–15% by weight,
MnO: 5.5–14% by weight, and
CaO: 0–7% by weight, in which the total weight of MnO and CaO should be 11% by weight or more and the weight of MnO should be equal to or larger than the weight of CaO.

In the glass composition of the present invention, the proportion of $SiO_2$ is limited to 54–60% by weight mainly from the viewpoint of maintaining a suitable viscosity of molten glass when melted. If the proportion is lower than 54% by weight, the viscosity becomes too low comparing with the liquidus temperature, which results in making the spinning difficult. On the other hand, if the proportion is more than 60% by weight, the viscosity becomes too high to meet the objects of the present invention.

The proportion of $ZrO_2$ is limited to 13–16% by weight. If the proportion is less than 13% by weight, sufficient alkali resistance cannot be obtained, whereas if the proportion is more than 16% by weight, the liquidus temperature arises rapidly, which results in making the spinning difficult.

The proportion of $Na_2O$ is limited to 12–15% by weight. If the proportion is less than 12% by weight, melting properties become insufficient and the liquidus temperature is heightened, whereas if the proportion is more than 15% by weight, the viscosity is lowered and evaporation of the alkali component from the cone increases.

The proportion of MnO should be 5.5–14% by weight and on the other hand, the total weight of MnO and CaO should be 11% by weight or more and the weight of MnO should be equal to or larger than the weight of CaO. If the proportion of MnO is less than 5.5% by weight and the other conditions are satisfied, the liquidus temperature is heightened, the melting properties become worse, the molten glass passed through the nozzles cannot easily be cooled, and the contribution to the alkali resistance is lowered. On the other hand, if the proportion is more than 14% by weight, the viscosity is lowered too low to spin properly.

CaO can be present up to 7% by weight in place of MnO within the conditions that MnO≧CaO and the total weight of MnO and CaO should be 11% by weight or more. If the proportion of CaO is more than 7% by weight or CaO>MnO, CaO shows a tendency to inhibit the function of MnO and also shows a strong tendency to heighten the liquidus temperature.

Contrary to the conventional alkali resistant glass composition containing $ZrO_2$ which can further contain a small amount of $Al_2O_3$, $Al_2O_3$ should not be added to the glass composition of the present invention in order to prevent the glass composition from heightening in the liquidus temperature and lowering in alkali resistance. Further, since $B_2O_3$ and $P_2O_5$ function as a deteriorating component as to alkali resistance, these components should not be added to the glass composition of the present invention, but the presence of these components as impurities up to 1% by weight can be permissible.

The glass composition of the present invention may contain such usually used components as $CaF_2$, $Na_2SO_4$, $Sb_2O_3$, $As_2O_3$, and the like as a clarifier within the range of about 1% by weight or less like other fiber forming glass compositions. Further, the glass composition of the present invention may contain other compounds such as $K_2O$, $Al_2O_3$, $Fe_2O_3$, $TiO_2$, etc. contaminated from the raw materials of the above-mentioned individual glass components, and $Cr_2O_3$, $SnO_2$, etc. exuded from the melting apparatus or the refractory of spinning apparatus as impurities within the range of about 1% by weight or less.

In the glass composition of the present invention, wherein the above-mentioned objects can be attained by using individual components in the limited amounts, the most characteristic point is to contain manganese oxide in a large excess, i.e. 5.5% by weight or more under the condition that the total weight of manganese oxide and calcium oxide is 11% by weight or more.

By containing manganese oxide in a large excess, the glass composition of the present invention is very excellent in melting properties, that is, can be melted more easier than E glass, to give uniform molten glass. Further, since the liquidus temperature of the glass composition is as low as about 1050°–1200° C. and its spinning temperature is also lowered, it can be spun under almost the same conditions as E glass. In addition, since the molten glass obtained can easily be cooled, evaporation of the alkalis is depressed and the cooling fins can be used for a long period of time, which results in improving stable spinning of glass fibers and in giving glass fibers more improved in alkali resistance.

More in detail, according to the glass composition of the present invention, although $ZrO_2$ is included in a large amount, the glass composition is very excellent in melting properties and can give a uniform glass. For example, according to a melting property test wherein a glass raw material mixture charged in a crucible is set in an electric furnace and melted and a time required for both an area of non-melted material and an area of molten glass at the upper part of the crucible becoming the same is measured and compared, the conventional $ZrO_2$ containing glass composition requires about 75 minutes, while the glass composition of the present invention requires only about 45 minutes, by using each 100 g of raw material mixture passing a 200 mesh sieve (Tyler) and melting at 1350° C. This can be explained from the facts as shown in Table 2 mentioned hereinafter that the glass composition of the present invention has a very low viscosity and about half of a viscosity of other conventional $ZrO_2$ containing glass composition at the same liquid phase temperature. Such excellent melting properties of the glass composition of the present invention seem to be partly due to the function of raw material of manganese as a strong flux.

As to spinning stability of glass fibers, it is generally recognized that a greater difference between the liquidus temperature and the spinning temperature makes the spinning more favorably. This is because if the difference between the liquidus temperature and the spinning temperature is small, the crystals easily grow in the molten glass until the molten glass passes through the nozzle or after passing through the nozzle, which results in cutting of glass fibers. But the spinning stability of glass fibers is not limited to the difference between the liquidus temperature and the spinning temperature as mentioned above, and is influenced by other factors such as uniformity of the molten glass, viscosity gradient, crystal growing rate, easiness in being cooled, and the like as well as the number of nozzles per one spinning furnace, diameter of the fiber, wind-up rate, presence or absence of cooling auxiliary devices such as cooling fins, kind of greige goods, and the like in practical operations.

For example, the problem of crystal growth particularly arises when ununiform portions such as striae and microcrystalline structure are present in the molten glass. In the case of uniform molten glass, spinning can be carried out without any troubles even if the difference between the liquidus temperature and the spinning temperature is small. Further even if such an ununiform portion is present in the molten glass in a considerable amount, since the molten glass is maintained at a considerably high temperature until passing through the nozzle plate and crystal growing hardly takes place so as to cause cutting of the fibers before passing through the nozzle, the spinning can be carried out without any troubles if the viscosity is suitable even in the case of setting the nozzle plate temperature at the liquidus temperature. In addition, even if ununiform structure which has a tendency to grow to crystals is present in the molten glass immediately passed through the nozzle, if the stream of molten glass has excellent easiness in being cooled, stable spinning can be obtained by rapid cooling effect which inhibits the growth of crystals.

Although the glass composition of the present invention has an unpreferable point in that the difference between the liquidus temperature and the spinning temperature (usually denoting a temperature showing a viscosity of 1000 poises) is relatively small, it is very excellent in the spinning stability, since it has excellent melting properties as mentioned above, and thus it has a very small amount of ununiform portions which cause growth and deposition of crystals, and in addition the temperature range wherein the spinning operation is conducted can be set very widely due to easiness of the glass composition in being cooled and possibility for rapid cooling of the molten glass passed through the nozzle.

That the glass composition of the present invention being easily cooled is caused by being colored purple or brown due to partial change of manganese oxide included in the glass composition to trivalent manganese. There is a remarkable tendency to dislike coloring of glass except for the use for bottles, and the like, but in the present invention, coloring of glass is positively employed considering the effect in being easily cooled. Since the colored glass fibers are used for reinforcing cement products, there is no problem in using such colored glass fibers.

The molten glass passed through the nozzle is rapidly cooled while forming meniscus. Heat dissipation in this case is almost by radiation. When the glass is colored, particularly the surface of molten glass is cooled remarkably, which results in stability of spinning favorably. The spinning operation temperature generally employed is a temperature at which a viscosity shows about 1000 poises. In the case of the glass composition of the present invention, the spinning operation temperature can be set widely, for example even to a viscosity of 400–500 poises, since the glass composition can easily be cooled and the molten glass is rapidly cooled immediately after spinning. Further, the thus obtained glass fibers have an advantage in that they are improved in strength comparing with ordinary glass fibers due to rapid cooling. Another advantage is that evaporation of the alkali components after passing through the nozzle is reduced due to effective cooling particularly on the surface, which results in prolongation of the life of cooling devices such as cooling fins. A conventional glass containing more than 10% by weight of alkali components is generally remarkable in evaporation of the alkali components from the molten glass after passed through the nozzle, which results in shortening of the life of cooling devices such as cooling fins, so that the cooling fins cannot be used in practical operation. On the contrary, the cooling fins can be used for the glass composition of the present invention.

By using the glass composition of the present invention, glass fibers having the same or more excellent performance comparing with conventional alkali resistant glass fibers can be produced. The excellent performance of the glass fibers produced by using the glass composition of the present invention is shown by, for example, a test for weight loss in an alkali solution, a test for change of strength of monofilament in an alkali solution with the lapse of time, a test for change of strength of strands in an alkali solution with the lapse of time, and a test for change of bending strength of a cement product reinforced with the strands with the lapse of time as mentioned hereinafter.

It is generally known that glass containing zirconium oxide is excellent in alkali resistance. Components other than zirconium oxide naturally influence the alkali resistance, for example, $B_2O_3$, $P_2O_5$ and $Al_2O_3$ function as an inhibiting component for the alkali resistance and greatly influence on retentive properties of strength. It is known that alkaline earth metal components fuction for increasing alkali resistance of glass fibers. According to the study of the present inventors, manganese oxide also functions for increasing the alkali resistance and the effect of it is greater than that of the alkaline earth metals. That is, when an alkaline earth metal, e.g. calcium oxide is replaced by manganese oxide and the content of MnO becomes 5.5% by weight or more and MnO+CaO≧11% by weight or more, the improvement of alkali resistance is clearly recognized, and finally the improvement in performance about 30% at most can be attained.

The present invention is illustrated but not limited by the following Example in which percents are by weight unless otherwise specified.

EXAMPLE

Using individual glass compositions listed in Table 1, melting properties were tested. Liquidus temperatures and viscosities of individual glass compositions are as listed in Table 2.

The test method was as follows.

Each glass raw material mixture was placed in a platinum crucible in an electric furnace and melted. In the initial stage, a melted solution sank to the bottom and the non-melted portion remained at the top. The non-melted layer became thinner and thinner gradually and at last the molten glass became to be seen from the center of the top of the crucible. A time required for the area of the non-melted portion and the area of the portion capable of seeing the molten glass becoming the same after placing the raw material mixture in the crucible was used for measuring the melting properties.

Each 100 g of glass raw material mixture passing a 200-mesh sieve was melted at 1350° C. and the above-mentioned time was measured with the following results:

Glass No. 7: about 45 minutes

Glass P*: about 75 minutes Glass Nos. 1 to 6, the glass compositions of the present invention, showed almost the same melting properties as Glass No. 7.

TABLE 1

| Component | | 1 | 2 | 3 | 4 | 5 | 6 | 7 | P* | E glass | C glass |
|---|---|---|---|---|---|---|---|---|---|---|---|
| $SiO_2$ | (wt %) | 58.0 | 57.0 | 57.0 | 57.5 | 55.5 | 57.5 | 58.0 | 62.0 | 54.5 | 67.0 |
| | (mol. %) | 64.3 | 63.6 | 62.5 | 63.2 | 60.6 | 63.5 | 63.7 | 67.8 | | |
| $ZrO_2$ | (wt %) | 14.0 | 15.0 | 14.5 | 15.5 | 13.5 | 15.0 | 15.0 | 17.0 | — | — |
| | (mol. %) | 7.6 | 8.1 | 7.8 | 8.3 | 7.2 | 8.1 | 8.0 | 9.2 | | |
| $Al_2O_3$ | (wt %) | — | — | 0.5 | — | — | — | — | — | 14.5 | 4.0 |
| | (mol. %) | | | 0.3 | | | | | | | |
| MnO | (wt %) | 14.0 | 14.0 | 8.0 | 7.0 | 10.0 | 10.5 | 8.0 | — | — | ZnO |
| | (mol. %) | 13.1 | 13.2 | 7.4 | 6.5 | 9.3 | 9.8 | 7.4 | | | 4.0 |
| CaO | (wt %) | — | — | 6.0 | 5.5 | 6.5 | 3.0 | 6.0 | 5.0 | 23.0 | 9.0 |
| | (mol. %) | | | 7.1 | 6.5 | 7.6 | 3.6 | 7.1 | 5.9 | | |
| $Na_2O$ | (wt %) | 14.0 | 14.0 | 14.0 | 14.5 | 14.5 | 14.0 | 13.0 | 16.0 | — | 12.0 |
| | (mol. %) | 15.0 | 15.1 | 14.9 | 15.5 | 15.3 | 15.0 | 13.8 | 17.1 | | |
| $B_2O_3$ | (wt %) | — | — | — | — | — | — | — | — | 8.0 | 4.0 |
| | (mol. %) | | | | | | | | | | |

(Note)
Glass Nos. 1 to 7 are the glass compositions of the present invention.
P* is the glass composition disclosed in Japanese Patent Appln. Kokoku (Post-Exam Publn.) No. 40126/74.

TABLE 2

| Item | Glass No. | | | | | | | | | | |
|---|---|---|---|---|---|---|---|---|---|---|---|
| | | 1 | 2 | 3 | 4 | 5 | 6 | 7 | P* | E glass | C glass |
| Liquidus temp. $(T_l)$ (°C.) | | 1050 | 1185 | 1190 | 1195 | 1100 | 1190 | 1205 | 1140 | 1080 | 1120 |
| Viscosity at $T_l$ (poises) | | 8000 | 1200 | 1000 | 1100 | 1600 | 1000 | 1000 | 20000 | 10000 | 1800 |
| Temperature at 1000 poises (°C.) | | 1212 | 1207 | 1190 | 1210 | 1175 | 1190 | 1205 | 1255 | 1185 | 1170 |
| Temperature at 500 poises (°C.) | | 1263 | 1260 | 1245 | 1260 | 1230 | 1245 | 1258 | 1315 | 1235 | 1230 |

(Note)
Glass Nos. 1 to 7 are the glass compositions of the present invention.
P* is the glass composition disclosed in Japanese Patent Appln. Kokoku (Post-Exam Publn.) No. 40126/74.

Individual glass compositions listed in Table 1 were spun by using a spinning furnace and a tip nozzle plate attached thereto having 400 orifices and ordinary cooling fins made of silver to produce glass fibers having an average diameter of 16μ with no deposition. Usable time of the silver fins, that is, from the attachment of the cooling fins among the nozzles to a time required for changing, was measured for each glass composition with the results as mentioned below:

Glass Nos. 1 to 7: 70–100 hours
P* glass: 15–20 hours
E glass: 150–200 hours
C glass: 15–20 hours As is clear from the above results, since the usable time of the cooling fins in the cases of P* glass and C glass is on the order of 15–20 hours, the cooling fins cannot be used in practical glass fiber production. On the other hand, although the glass composition of the present invention contains a large amount of alkali like P* glass and C glass, the cooling fins can be used for a long period of time.

The glass fibers thus produced were subjected to various alkali resistance tests mentioned below.

(1) Weight loss test

Individual glass fibers having a length of 1 cm were treated with various alkali solutions under the conditions mentioned below and their weight losses were measured.

The treating conditions were as follows:

(i) Glass fibers were treated with a 50% cement extract, which had been obtained by filtering a slurry of a mixture of Portland cement:water=1:10 overnight and diluting the resulting extract two times, at 90° C. for 18 hours.

(ii) Glass fibers were treated with a synthesis cement solution (NaOH 0.88 g/l., KOH 3.45 g/l., and Ca(OH)$_2$ 0.48 g/l.) at 90° C. for 18 hours.

(iii) Glass fibers were treated with a Ca(OH)$_2$ solution with a density of 0.48 g/l. at 90° C. for 48 hours.

(iv) Glass fibers were treated with a Ca(OH)$_2$ solution with a density of 0.48 g/l. at 90° C. for 240 hours.

(v) Glass fibers were treated with the same 50% cement extract as used in the above item (i) at 64° C. for 96 hours.

(vi) Glass fibers were treated with a mixed solution of NaOH 0.088 g/l. and KOH 0.345 g/l. at 64° C. for 96 hours.

(vii) Glass fibers were treated with a cement extract, which had been obtained by filtering a slurry of a mixture of Portland cement:water=1:10 overnight, at 20° C. for 2 months.

The results are as shown in Table 3.

TABLE 3

| Treating conditions | Glass No. | | | | | |
|---|---|---|---|---|---|---|
| | 2 | 4 | 5 | 6 | P* | E glass |
| | (%) | (%) | (%) | (%) | (%) | (%) |
| (i) | 0.42 | 0.45 | 0.58 | 0.49 | 0.56 | 6.5 |
| (ii) | 0.42 | 0.40 | 0.46 | 0.45 | 0.48 | 7.1 |
| (iii) | — | 0.54 | — | — | 0.53 | — |
| (iv) | — | 0.80 | — | — | 0.78 | — |
| (v) | 0.94 | — | — | — | 1.34 | 16.5 |
| (vi) | 0.26 | 0.26 | 0.32 | 0.28 | 0.31 | 3.0 |
| (vii) | 0.48 | — | — | — | 0.65 | 5.5 |

P* is the glass composition disclosed in Japanese Patent Appln. Kokoku (Post-Exam Publn.) No. 40126/74.

(2) Change of strength of strands with the lapse of time

The glass fiber strands thus produced were treated with the same cement extract as used in item (vi) listed in Table 3 at 64° C. for prescribed days as listed in Table 4 and their strength was measured according to JIS R 3413.

The results are as shown in Table 4.

TABLE 4

| Glass No. | Treating day | | | |
|---|---|---|---|---|
| | 0 | 6 | 18 | 28 |
| 4 | 51.2 | 45.5 | 27.8 | 18.7 |
| P* | 35.3 | 29.5 | 21.4 | 13.3 |
| E glass | 52.0 | 23.7 | 12.1 | 7.6 |

P* is the glass composition disclosed in Japanese Patent Appln. Kokoku (Post-Exam Publn.) No. 40126/74.
(Unit: g/Tex)

(3) Change of strength of cement products reinforced with glass fibers with the lapse of time Cement products containing about 5% by weight of glass fibers were dried in the air for 1 week after the molding, and then treated with hot water at 60° C. (shown in Table 5) or at 80° C. (shown in Table 6) for prescribed days and bending strength of these treated products were tested according to JIS A 1408.

The results are as shown in Tables 5 and 6.

TABLE 5

| Glass No. | Treatment with hot water at 60° C. | | | | | |
|---|---|---|---|---|---|---|
| | Treating days | | | | | |
| | 0 | 1 | 3 | 8 | 15 | 30 |
| 4 | 336 | 366 | 338 | 315 | 265 | 213 |
| P* | 294 | 285 | 305 | 258 | 197 | 183 |

P* is the glass composition disclosed in Japanese Patent Appln. Kokoku (Post-Exam Publn.) No. 40126/74.
(Unit: kg/cm$^2$)

TABLE 6

| Glass No. | Treatment with hot water at 80° C. | | | | |
|---|---|---|---|---|---|
| | Treating days | | | | |
| | 0 | 1 | 3 | 5 | 8 |
| 4 | 336 | 313 | 249 | 188 | 167 |
| P* | 294 | 250 | 210 | 173 | 142 |

P* is the glass composition disclosed in Japanese Patent Appln. Kokoku (Post-Exam Publn.) No. 40126/74.
(Unit: kg/cm$^2$)

As is clear from the above results, the glass composition of the present invention is excellent in melting properties and can easily be cooled, and can be spun under almost the same conditions as E glass. In addition, the glass fibers thus produced are excellent in alkali resistance and have high strength, and can be used for reinforcing cement products without lowering their strength with the lapse of time.

What is claimed is:

1. A glass composition consisting essentially of the following compounds and respective weight percents:
   SiO$_2$: 55.5–58.0
   ZrO$_2$: 13.5–15.5
   Na$_2$O: 13.0–14.5
   MnO: 7.0–10.5
   CaO: 3.0–6.5 wherein the total weight of MnO and CaO equals or exceeds 11% by weight and the weight of MnO equals or exceeds the weight of CaO.

2. A glass composition according to claim 1 wherein the temperature of the composition is equal to or less than 1212° C. when the composition has a viscosity of 1000 poise.

3. Alkali-resistant glass fibers consisting essentially of the following compounds and respective weight percents:

$SiO_2$: 55.5–58.0
$ZrO_2$: 13.5–15.5
$Na_2O$: 13.0–14.5
$MnO$: 7.0–10.5
$CaO$: 3.0–6.5 wherein the total weight of MnO and CaO equals or exceeds 11% by weight and the weight of MnO equals or exceeds the weight of CaO.

* * * * *